US008343755B2

(12) United States Patent
Begley et al.

(10) Patent No.: US 8,343,755 B2
(45) Date of Patent: Jan. 1, 2013

(54) MICRODEVICES FOR CHEMICAL SENSING AND CHEMICAL ACTUATION

(75) Inventors: Matthew R. Begley, Charlottesville, VA (US); James P. Landers, Charlottesville, VA (US); Jerome P. Ferrance, Charlottesville, VA (US); Ling Huang, Charlottesville, VA (US); Michael H. Jones, Washington, DC (US); Marcel Utz, Charlottesville, VA (US); Scott Barker, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 669 days.

(21) Appl. No.: 11/989,794

(22) PCT Filed: Aug. 1, 2006

(86) PCT No.: PCT/US2006/030127
§ 371 (c)(1),
(2), (4) Date: Apr. 16, 2010

(87) PCT Pub. No.: WO2007/030240
PCT Pub. Date: Mar. 15, 2007

(65) Prior Publication Data
US 2010/0233792 A1    Sep. 16, 2010

Related U.S. Application Data

(60) Provisional application No. 60/704,274, filed on Aug. 1, 2005, provisional application No. 60/774,293, filed on Feb. 16, 2006.

(51) Int. Cl.
*C12M 1/34* (2006.01)

(52) U.S. Cl. ............ 435/287.2; 422/400; 422/401; 422/420; 422/82.05; 422/82.08; 435/6.1; 435/287.9; 435/288.7; 436/164; 436/518; 436/524; 436/531; 436/805

(58) Field of Classification Search ................ None
See application file for complete search history.

(56) References Cited

U.S. PATENT DOCUMENTS

| | | |
|---|---|---|
| 5,958,349 A | 9/1999 | Petersen et al. |
| 6,312,929 B1 | 11/2001 | McMillan |
| 6,368,871 B1 | 4/2002 | Christel et al. |
| 6,369,893 B1 | 4/2002 | Christel et al. |
| 6,374,684 B1 | 4/2002 | Dority |
| 6,403,037 B1 | 6/2002 | Chang et al. |
| 6,431,476 B1 | 8/2002 | Taylor et al. |
| 6,440,725 B1 | 8/2002 | Pourahmadi et al. |
| 6,534,645 B2 | 3/2003 | McMillan |
| 6,565,815 B1 | 5/2003 | Chang et al. |
| 6,660,228 B1 | 12/2003 | Chang et al. |
| 6,664,104 B2 | 12/2003 | Pourahmadi et al. |
| 6,713,297 B2 | 3/2004 | McMillan et al. |
| 6,739,531 B2 | 5/2004 | Taylor |
| 6,767,706 B2 | 7/2004 | Quake et al. |
| 6,783,736 B1 | 8/2004 | Taylor et al. |
| 6,783,934 B1 | 8/2004 | McMillan et al. |
| 6,818,185 B1 | 11/2004 | Petersen et al. |
| 6,819,027 B2 | 11/2004 | Saraf |

(Continued)

*Primary Examiner* — Chris L Chin
(74) *Attorney, Agent, or Firm* — Schwegman Lundberg & Woessner, P.A.

(57) ABSTRACT

The invention relates to sensors for detecting chemical and biological material and for chemical actuation. In particular, the sensors of the present invention incorporates membranes or beams that are deformable in the presence of chemical adsorption on its surface. The sensor of the present invention contains a polymeric membrane or beam (102) that is clamped at least at two opposing ends (104) and (106).

26 Claims, 12 Drawing Sheets

U.S. PATENT DOCUMENTS

| | | |
|---|---|---|
| 6,878,540 B2 | 4/2005 | Pourahmadi et al. |
| 6,881,541 B2 | 4/2005 | Petersen et al. |
| 6,887,693 B2 | 5/2005 | McMillan et al. |
| 6,893,879 B2 | 5/2005 | Petersen et al. |
| 6,911,327 B2 | 6/2005 | McMillan et al. |
| 6,940,598 B2 | 9/2005 | Christel et al. |
| 6,942,971 B2 | 9/2005 | McMillan et al. |
| 6,979,424 B2 | 12/2005 | Northrup et al. |
| 6,987,018 B2 | 1/2006 | Taylor et al. |
| 7,101,509 B2 | 9/2006 | Chang et al. |
| 7,135,144 B2 | 11/2006 | Christel et al. |
| 7,188,001 B2 | 3/2007 | Young et al. |
| 7,226,732 B2 | 6/2007 | Sakai et al. |
| 7,255,833 B2 | 8/2007 | Chang et al. |
| 7,294,466 B2 | 11/2007 | McMillan |
| 7,410,760 B2 | 8/2008 | Swenson |
| 7,462,323 B1 | 12/2008 | Chang et al. |
| 7,569,346 B2 | 8/2009 | Petersen et al. |
| 7,575,721 B2 | 8/2009 | Chang et al. |
| 7,621,418 B2 | 11/2009 | Chang |
| 7,687,232 B2 | 3/2010 | Gyllensten et al. |
| 7,803,549 B2 | 9/2010 | Swenson |
| 7,914,994 B2 | 3/2011 | Petersen et al. |
| 2001/0012612 A1 | 8/2001 | Petersen et al. |
| 2001/0019114 A1 | 9/2001 | Arakawa et al. |
| 2002/0019060 A1 | 2/2002 | Petersen et al. |
| 2002/0025576 A1 | 2/2002 | Northrup et al. |
| 2002/0031768 A1 | 3/2002 | McMillan et al. |
| 2002/0034745 A1 | 3/2002 | McMillan et al. |
| 2002/0034746 A1 | 3/2002 | McMillan et al. |
| 2002/0039783 A1 | 4/2002 | McMillan et al. |
| 2002/0042125 A1 | 4/2002 | Petersen et al. |
| 2002/0045246 A1 | 4/2002 | McMillan et al. |
| 2002/0055167 A1 | 5/2002 | Pourahmadi et al. |
| 2002/0058282 A1 | 5/2002 | McMillan et al. |
| 2002/0109844 A1 | 8/2002 | Christel et al. |
| 2002/0168299 A1 | 11/2002 | Chang et al. |
| 2002/0175079 A1 | 11/2002 | Christel et al. |
| 2002/0187547 A1 | 12/2002 | Taylor et al. |
| 2003/0066915 A1 | 4/2003 | Taylor |
| 2003/0152492 A1 | 8/2003 | Chang et al. |
| 2003/0162304 A1 | 8/2003 | Dority et al. |
| 2003/0164658 A1 | 9/2003 | Saraf |
| 2003/0221771 A1 | 12/2003 | Chang et al. |
| 2004/0096819 A1 | 5/2004 | McMillan et al. |
| 2004/0101859 A1 | 5/2004 | Moon |
| 2004/0122559 A1 | 6/2004 | Young et al. |
| 2004/0166031 A1 | 8/2004 | Taylor et al. |
| 2004/0200909 A1 | 10/2004 | McMillan et al. |
| 2005/0003374 A1 | 1/2005 | Swenson |
| 2005/0042137 A1 | 2/2005 | Petersen et al. |
| 2005/0069898 A1 | 3/2005 | Moon et al. |
| 2005/0095603 A1 | 5/2005 | Mokkapati et al. |
| 2005/0194316 A1 | 9/2005 | Pourahmadi et al. |
| 2005/0244837 A1 | 11/2005 | McMillan et al. |
| 2005/0255516 A1 | 11/2005 | McMillan et al. |
| 2006/0014200 A1 | 1/2006 | McMillan |
| 2006/0019379 A1 | 1/2006 | Taylor et al. |
| 2006/0027686 A1 | 2/2006 | Taylor et al. |
| 2006/0068398 A1 | 3/2006 | McMillan |
| 2006/0068399 A1 | 3/2006 | McMillan et al. |
| 2006/0169708 A1 | 8/2006 | Chang |
| 2006/0177844 A1 | 8/2006 | Ching et al. |
| 2006/0229441 A1 | 10/2006 | Gall |
| 2006/0275178 A1 | 12/2006 | Chang et al. |
| 2007/0259362 A1 | 11/2007 | Sakai et al. |
| 2008/0014114 A1 | 1/2008 | Van Atta et al. |
| 2008/0038737 A1 | 2/2008 | Smith et al. |
| 2008/0057572 A1 | 3/2008 | Petersen et al. |
| 2008/0193946 A1 | 8/2008 | McMillan |
| 2008/0227090 A1 | 9/2008 | Sakai et al. |
| 2008/0254532 A1 | 10/2008 | Chang et al. |
| 2008/0286151 A1 | 11/2008 | Chang et al. |
| 2008/0286798 A1 | 11/2008 | Swenson |
| 2009/0047669 A1 | 2/2009 | Zhang et al. |
| 2009/0062135 A1 | 3/2009 | Delfour et al. |
| 2009/0308886 A1 | 12/2009 | Chang et al. |
| 2010/0068706 A1 | 3/2010 | Pourahmadi et al. |
| 2010/0129827 A1 | 5/2010 | Mcmillan |
| 2010/0136569 A1 | 6/2010 | Moon et al. |
| 2010/0233704 A1 | 9/2010 | Michot et al. |
| 2010/0240049 A1 | 9/2010 | Svanholm Barrie et al. |
| 2011/0053155 A1 | 3/2011 | Gall |

MICRODEVICES FOR CHEMICAL SENSING AND CHEMICAL ACTUATION

This application claims priority of U.S. Provisional Patent Application Nos. 60/704,274, filed Aug. 1, 2005, and 60/774,293, filed Feb. 16, 2006, which are incorporated herein by reference.

FIELD OF THE INVENTION

The invention relates to sensors for detecting chemical and biological material and for chemical actuation. In particular, the sensors of the present invention incorporates membranes or beams that are deformable in the presence of chemical adsorption on its surface.

BACKGROUND OF THE INVENTION

The advent of microdevice technology for biochemical and chemical analysis has begun to revolutionize the world of science. While the microchip revolution is rooted in ultra fast separations, recent forays seek to move laborious and time-intensive steps for sample chemical and biological identification to microchips. Success with these developments will supplant the use of multiple instruments in the laboratory with the cost-effectiveness and rapid response of using a single miniaturized rapid analysis system. Many of these emerging total analysis systems (μ-TAS) or "lab-on-a-chip" sensor systems can simply be interfaced with a computer for automated, user-friendly applications.

A large breadth of biological and chemical analyses will be possible with microdevices having multifunction capabilities. The key to creating multifunctional devices with turn-key operation capability will be the integration of processes for total analysis. For example, for genomic analysis, the totally integrated analysis would require that steps such as cell sorting, cell lysis, DNA extraction, DNA quantitation, and DNA amplification (via PCR) be carried out on-chip prior to the analysis step (e.g., electrophoresis or microarray) on the same microdevice.

One of the important issues for proper function of a μ-TAS is the ability to detect a wide variety of chemical and biological analytes, such as ions, drugs, DNA and proteins. A variety of sensors have been developed to indicate the presence of specific species, including quartz crystal microbalances, surface plasmon resonance sensors and fluorescence-based sensors. However, there is a significant need for simple, inexpensive sensors that exhibit high sensitivity, rapid response, and smaller size to facilitate integration into μ-TAS that might be portable or hand-held.

One approach to creating highly specific and sensitive detectors is to couple surface adsorption and mechanical deformation of microfabricated cantilevers. If the surface is functionalized to be chemically-selective, then bending of the cantilevers is a clear indicator of the presence of target molecules. Current approaches utilize silicon cantilevers which are microfabricated using well-established sacrificial surface micromachining techniques. The surface of the cantilever is then functionalized by applying a thin coating that is used to control the specific adsorption of molecules/analytes: for example, gold coatings are used with well-established gold-thiol chemistry to make sensors that are chemically-selective for DNA (Marie et al., *Ultramicroscopy* 91:29-36, 2002) or prostate specific antigens (PSA) (Guanghua et al., *Nature Biotechnology* 19, 856-860, 2001). This approach has the distinct advantage of the ability to perform label-less detection, i.e., the analytes do not need to be labeled with a fluorescent tag. By using microfabricated arrays of many cantilevers, the potential exists to combine multiple surface functionalizations to create multiplexed assays that can be scanned in an automated fashion to indicate the simultaneous presence of multiple analytes.

U.S. Pat. No. 6,289,717 to Thundat et al. discloses a sensor for detecting specific binding reactions. The sensor provides a cantilever with one of its surfaces coated with specific binding partners, while the other surface is covered with a different, possibly inert, material. As long as the amount of adsorption is different on the opposing surfaces, or there are different interactions of monitored molecules on opposing surfaces, there will be a differential stress. The specific binding interaction is manifested as changes in the differential surface stress of the cantilever surface. If a specific interaction does not take place, there will not be any change in surface stress when compared to a reference microcantilever. These changes in differential surface stress manifest themselves as changes in cantilever deflection which can be measured with a sub-angstrom sensitivity.

U.S. Published Patent Application No. 2006/0075803 to Boisen et al. improves the cantilever of Thundat et al. by using polymer-based cantilever in an array for high throughput screening, and improved stability and sensitivity, but still requires some form of optical interrogation.

Although such chemo-mechanical sensor concepts have proven their utility, current devices are limited by to several disadvantages. First, the use of silicon (or other inorganic materials) limits both sensitivity (due to the large stiffness of such materials) and robustness (due to the small failure strains and brittle nature of such materials) of such devices. The stiffness of these materials is particularly problematic; adsorption typically induces cantilever deflections on the order of 10-100 nm (Lavrik et al., *Review of Scientific Instruments* 75:2229-2253, 2004; Lang et al., *Materials Today*, April, 30-36, 2005), which requires sophisticated laser-based detection hardware. Second, prior art cantilevers are stand alone detectors that are not incorporated into an integrated μ-TAS, possibly due to the required sophisticated detection system that cannot be integrated directly into a μ-TAS.

Consequently, there remains a critical need to develop new approaches that: (i) exhibit much larger deformations upon adsorption, so that more simplistic and cost-effective transduction mechanisms (such as capacitance, resistance, optical interferometry, simple visual (color change) detection) can be utilized, and (ii) incorporate materials and microfabrication processes that enable transduction to be directly integrated into the microchip itself.

SUMMARY OF THE INVENTION

An object of the invention is to provide local, high resolution and label-free molecular recognition measurements on a stable and sensitive portable device.

Another object of the invention is to provide a real-time local monitoring of chemical and biological interactions in a μ-TAS.

A further object of the invention is to provide a sensor with an improved stability and sensitivity compared to silicon-based cantilever sensors.

An even further object of the invention is to provide a valve that is actuated by pre-selected chemical adsorbed on its surface.

An even further object of the invention is to provide a sensor or actuator which is simple and inexpensive to fabricate.

The objects of the present invention are achieved by utilizing polymeric materials in microfabricated structures (membranes or beams) capable of substantial deformation with binding events, such that sensitive detection of analytes is possible with the μ-TAS platform. Specifically, the present invention manipulates mechanical bifurcations (i.e., buckling) to amplify the coupling between adsorption and deformation.

An advantage of some of the present invention is the ability to create structures that are sensitive to adsorption, yet robust (i.e., tolerant to flow-induced or impact loading). This phenomenon can be exploited to create micro-valves that respond to adsorption, thus enabling chemically-actuated control features. Other advantages may include improved portability (by eliminating the need for external hardware to detect motion), greater sensitivity, and simplified integration into existing μ-TAS.

The chemical and/or biological sensor of the present invention contains a polymeric membrane or beam that is clamped at least at two opposing ends (elsewhere in this application, where the term "membrane" is used, the term "beam" may also be substituted therein instead). In certain embodiments, the polymeric membrane may be attached to a platform along parts of, or the entire periphery. The membrane deforms in response to an analyte adsorbed to its surface. This deformation results from the surface stress on the membrane, along the plane of the surface (in-plane stress), which tends to lengthen the membrane. Because the membrane is clamped at both ends, it cannot lengthen, and thus, is displaced in a direction different than that of the original plane of the membrane (the plane of the membrane when there is no analyte adsorbed on its surface).

Key to this invention is the mechanism based on in-plane stress, which is different from that of the cantilever sensors common in the art. With cantilever sensors, the analyte is adsorbed only on one surface of the membrane, which causes a stress difference between the analyte-binding surface and the non-binding surface. To relieve this stress gradient, the cantilever bends in the direction of the stress gradient. As such, in the cantilever sensor, the physical quantity driving deformation is a resultant moment (or torque). In contrast and a distinguishing characteristic, the present invention relies on any driving force parallel to the membrane (in-plane stress), which results in deformation, regardless of whether or not it occurs on one side or the other. Therefore, the membrane in the present invention is not limited to analyte binding to only one surface—a key distinction from the cantilever-based system. Analyte binding on both surfaces will, in fact, double the driving force for out-of-plane deformation. Again, this is in stark contrast to the cantilever sensor, for which analyte adsorption on both surfaces of the structure eliminates the driving force (as there is no stress gradient perpendicular to the membrane), and, therefore, produces no bending of the cantilever. On the other hand, in the present invention, analyte adsorption on both surfaces would still result in an in-plane driving force and an out-of-plane movement of the membrane.

In a preferred embodiment, the surface of the membrane of the present invention is derivatized to capture a specific analyte. For example, the membrane surface may contain one member of a binding pair attached thereon to capture the other member of the binding pair as an analyte. Binding pair, as used herein, describes a pair of molecules (each being a member of a specific binding pair) which are naturally-derived or synthetically-produced. One member of the pair of molecules, has a region on its surface, or a particular structure, which specifically binds to, and is therefore defined as complementary with, a particular spatial and polar organization of the other molecule, so that the pair have the property that leads to a binding event that is specific to each other.

It is important to note that the membrane structure has functionality beyond that as a sensor. In another embodiment, the membrane also functions as chemically-actuated valve. In this embodiment, the membrane may block the flow of fluid in a μ-TAS device or microfluidic circuit when an analyte is not present; however, the presence of the analyte adsorbed on its surface deforms the valve and allows the fluid to flow. The converse may also be engineered where the valve allows fluid to flow, but in the presence of an analyte, the valve deforms to block the flow of fluid.

In a preferred embodiment, the sensor or valve is used in a μ-TAS device for detecting analytes or for regulating fluid flow.

DETAILED DESCRIPTION OF THE PREFERRED EMBODIMENTS

Figure 1:
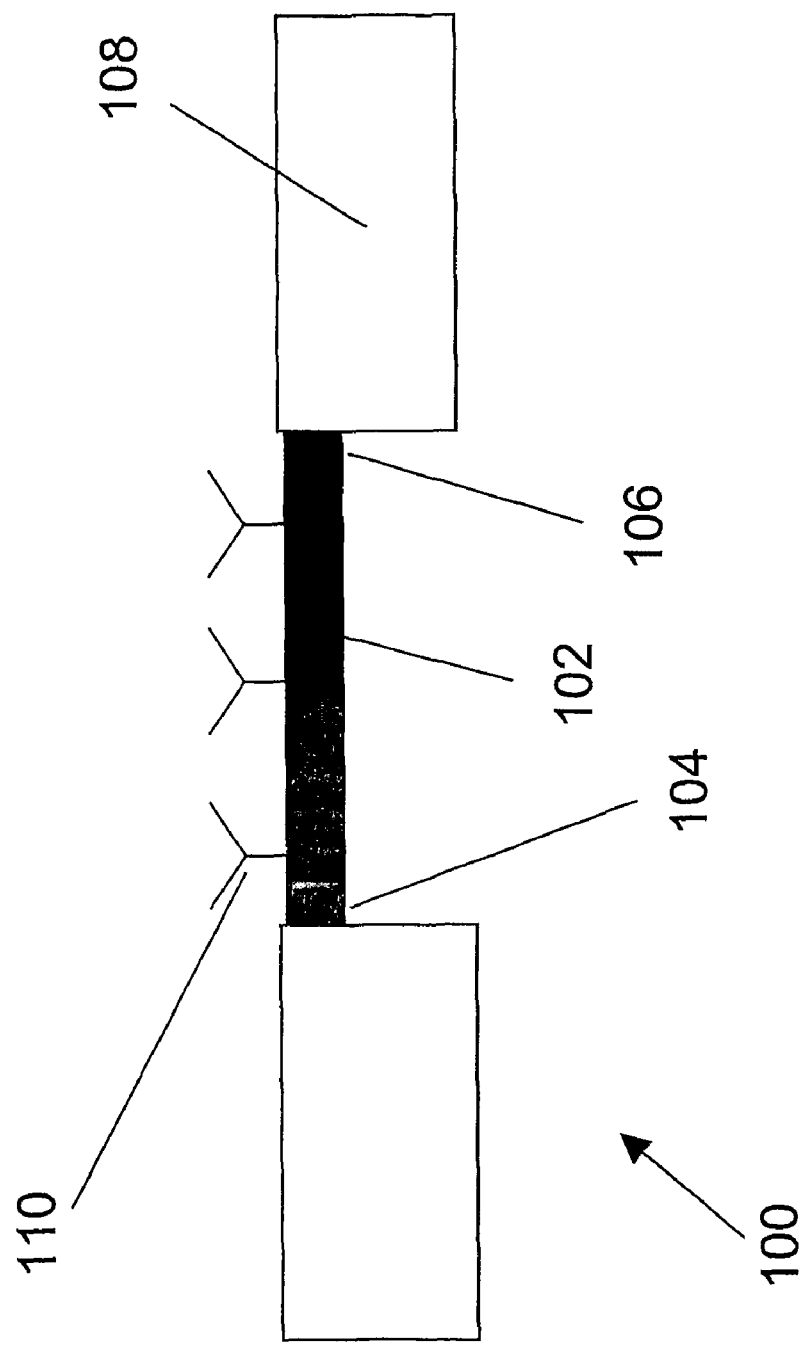
FIG. 1 is a drawing showing a schematic of the sensor without an adsorbed analyte.

A schematic diagram of the present sensor 100 is depicted in FIG. 1. The sensor 100 contains a membrane 102 that is clamped to a platform 108 at least at two ends 104, 106 or around part of or the entire periphery of the membrane. To facilitate specific binding to the analyte, the surface or surfaces of the membrane 102 may be derivatized with a binding member 110 of a binding pair, such as antibody/antigen or complimentary nucleic acids. Although FIG. 1 shows one surface of the membrane 102 being derivatized with a binding member, the other side or both surfaces may contain the binding member depending on which side of the membrane comes in contact with the analyte. If both sides of the membrane 102 come in contact with the analyte, both sides may contain the binding member.

Figure 2:
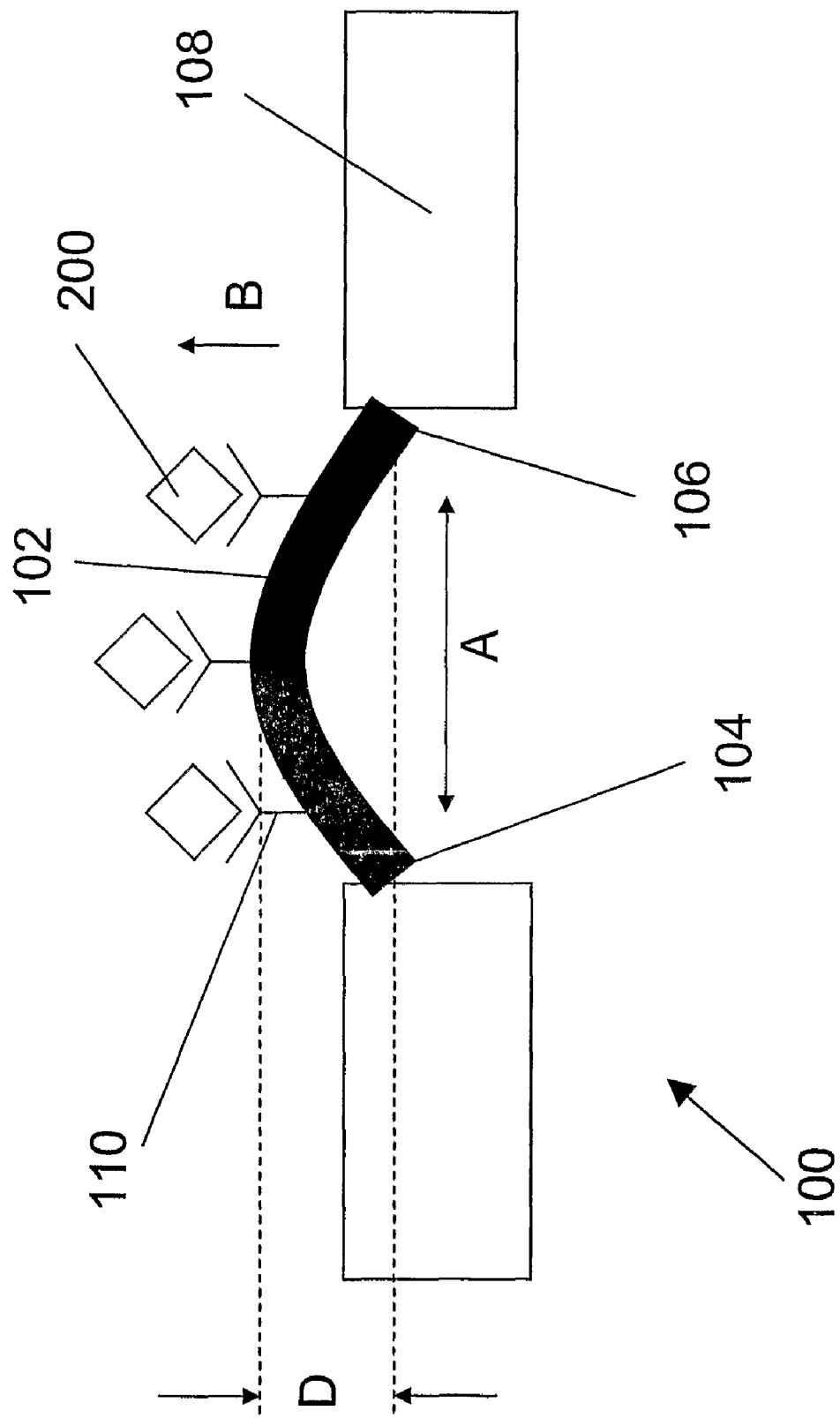
FIG. 2 is a drawing showing a schematic of the sensor after binding of an analyte.

As shown in FIG. 2, when the analyte 200 binds to the binding member 110, the membrane 102 deform out-of-plane by distance D. This deformation is caused by the surface stress in direction A, that tends to stretch the membrane 102 in that direction. Because the membrane 102 is clamped at both ends 104 and 106, the membrane 102 deforms out-of-plane to relieve the stress. The presence of the analyte is, thus, detected by detecting the deformation of the membrane 102. Although FIG. 2 shows the membrane 102 deforming upwards in direction B, the membrane 102 may be engineered to deform downward in a direction opposite of B. This can be accomplished by fabricating a beam that is not perfectly straight, but rather has a kink, or slight angle. This kink (which can be built into either a beam or a clamped film) causes the structure to deflect in the direction that the tip of the kink points. The kink angle places a large role in defining the relationship between adsorption and deflection. For example, a microfabricated sensor could be constructed with slender "v"-shaped beams (kinked or bent structure), such as that shown in FIG. 11. This allows stresses generated along the axes of the freestanding beams to be translated into in-plane displacements along the symmetry plane. The asymmetry of the structure, and the clamped boundary conditions implies, importantly, that single-sided adsorption is not a prerequisite. This not only facilitates surface functionalization but also increases sensitivity because the entire surface of the structure is utilized. The structural asymmetry increases sensitivity over straight devices that exploit buckling and induces a directional bias that facilitates transduction. The in-plane deformation can be easily monitored using vernier scales, capacitance gauges that are tuned to the displacement range of interest, or any number of other methods that may be appropriate at this scale.

In various embodiments, the surface of the polymeric material can either be directly functionalized or a functional coating can be applied. Direct functionalization is preferred, as it does not introduce an additional layer that increases stiffness and decreases sensitivity. The surface derivatization may include enzymes, peptides, proteins, polysaccharides, nucleic acids, carbohydrates, antibody or antigen molecules, pharmacological agents (i.e., drugs, including small organic molecules such as aspirin), other small molecules, other biopolymers, and any class of chemical compounds which react with one or more analytes or other biopolymers in a sample in contact with the coating. Preferably, the membrane surface includes a member of a binding pairs which include but are not limited to antigen-antibody, biotin-avidin, hormone-hormone receptor, receptor-ligand, enzyme-substrate, IgG-protein A, and nucleic acid-nucleic acid. The interaction of one or more analytes in the sample with the molecule on the surface produces a stress-induced deformation to the sensor membrane.

Of particular interest is the hybridization of single stranded DNA or RNA molecules where the molecules are either covalently attached to the membrane or attached to the surface through the other mechanisms known in the art. Direct measurement of polynucleotide hybridization is important because it eliminates the need for intermediate amplification steps and provides for extreme specificity. This same concept can be extended to aptamers for extension to binding a wide variety of molecules.

Polydimethylsiloxane (PDMS) and Polymethylmethacrylate (PMMA) are two ideal candidates for use as deformable polymers, but the invention described herein is not limited to these. A diverse array of polymeric materials can be envisioned as candidates with tunable deformation properties for the said invention. Although PDMS and PMMA are preferred, many types of elastomeric polymers can be useful in for the membrane of the present invention, which include, but are not limited to, polyisoprene, polybutadiene, polychloroprene, polyisobutylene, poly(styrene-butadiene-styrene), the polyurethanes, and silicone polymers; or poly(bis(fluoroalkoxy)phosphazene) (PNF, Eypel-F), poly(carborane-siloxanes) (Dexsil), polyacrylonitrile-butadiene) (nitrile rubber), poly(1-butene), poly(chlorotrifluoroethylene-vinylidene fluoride) copolymers (Kel-F), poly(ethyl vinyl ether), poly (vinylidene fluoride), poly(vinylidene fluoride-hexafluoropropylene)copolymer (Viton), elastomeric compositions of polyvinylchloride (PVC), polysulfone, polycarbonate, polymethylmethacrylate (PMMA), polytetrafluoroethylene (Teflon), polydimethylsiloxane (PDMS), and blends thereof.

For the case of PDMS, a variety of derivatization techniques have been described in the literature (Makamba et al., *Electrophoresis* 24 (21): 3607-3619, 2003; and Belder et al., *Electrophoresis* 24 (21): 3595-3606, 2003). For example, PDMS can be derivatized with a two step process that involves plasma oxidation followed by silanization (Wang et al., *Electrophoresis* 24 (9): 1442-1450, 2003; and Papra et al., *Langmuir* 17 (13): 4090-4095, 2001) or, alternatively by UV polymer grafting (Hu et al., *Langmuir* 20 (13): 5569-5574, 2004). More simplistic approaches to PDMS surface adsorption have been reported for immobilization of select biomolecules (Linder et al., *Anal. Chem.* 73 (17):4181-4189, 2001) while polyelectrolyte multilayers have been exploited for electrostatically-derivatizing PDMS (Liu et al., *Anal. Chem.* 72 (24):5939-5944, 2000). Derivatization of PDMS has even been achieved with phospholipid bilayers which could subsequently be utilized in immunoassays (Yang et al., *Anal. Chem.* 73 (2): 165-169, 2001).

PMMA can also be functionalized using a variety of techniques. Chemical derivatization of PMMA has been demonstrated using V-UV irradiation followed by chemical vapor deposition, selective amino silane chemisorption and then protein immobilization (Hozumi et al., *J. Vac. Science and Tech.* 22(4)1836-1841, 2004). Non-UV irradiation derivatization methods have also been developed such as lithium aluminum hydride reduction followed by silanization (Cheng et al., *Sensor and Act.* 99: 186-196, 2004). PMMA functionalization for immobilization of DNA can be carried out by amidating the surface for subsequent reaction with homo- or hetero-functional cross linkers (Cheng et al.). Electrostatic derivatization of PMMA using polyelectrolyte multilayers (PEMs) has also been demonstrated in a manner commensurate with receptor immobilization (Cheng et al.).

In similar fashion, derivitization schemes are abundant in the literature for the other polymers.

Figure 10:
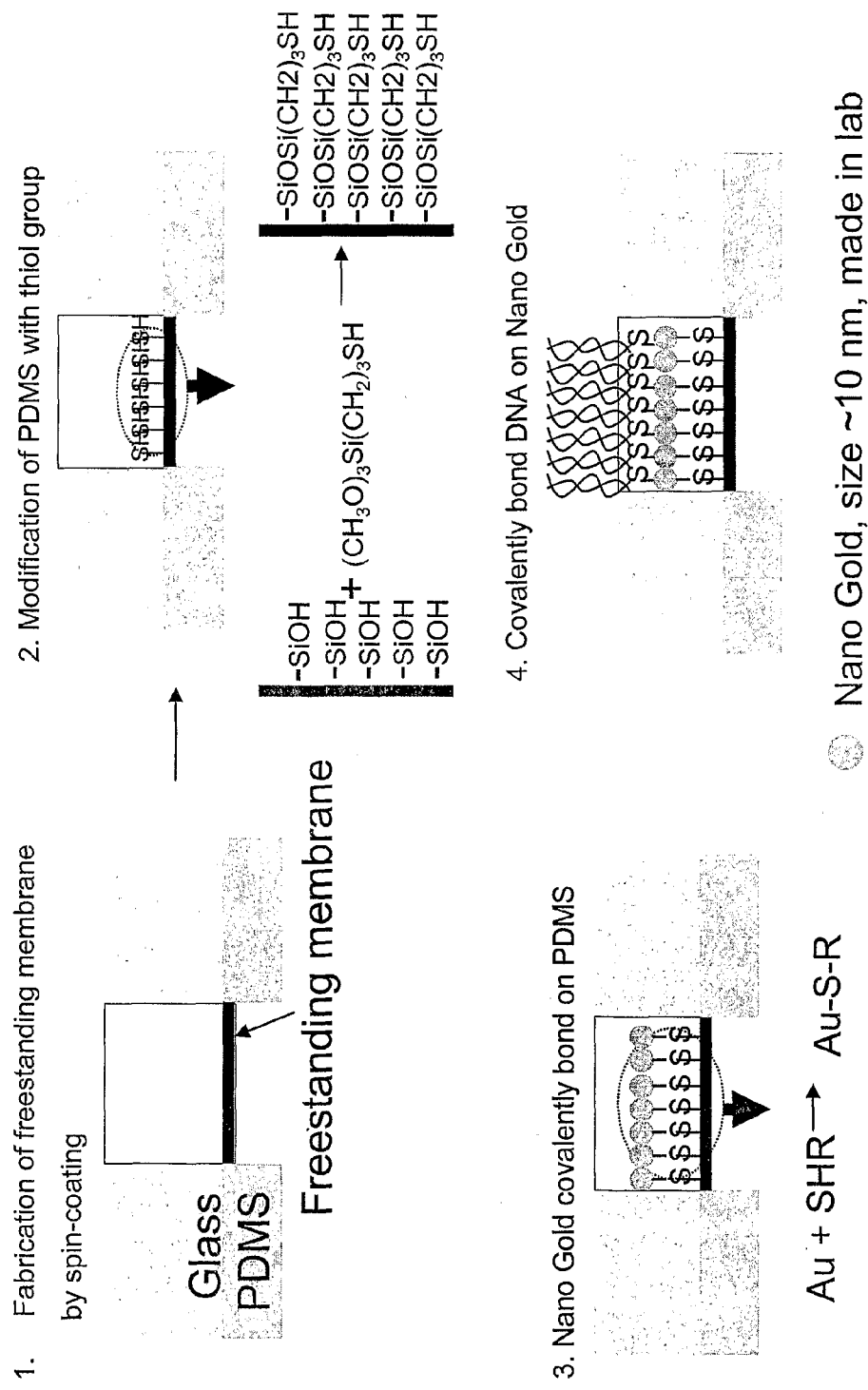
FIG. 10 are drawings showing a method of surface derivatization of the membrane.

FIG. 10 depicts a process for derivatizing PDMS membranes with DNA oligonucleotides. The process involves silanizing the PDMS surface by reacting with $(CH_3O)_3Si(CH_2)_3SH$. The silanized surface is then covalently bound to nano-gold particles of approximately 10 nm in diameter. The nano-gold particles are then covalently bound to DNA oligonucleotides to be used in detecting complementary DNA molecules. Various methods for detection is known in the art for the detection. The deformation of the membrane is most commonly recorded optically by shining a light beam onto the membrane and monitoring the reflection of the membrane by means of a photosensitive detector, such as a photodiode. The optical sensing means may, thus, include a light emitter and a light detector. The light emitter may be a low energy laser device, such as a solid state laser, e.g., a laser diode or a vertical cavity surface-emitting laser (VSCEL) emitting at an appropriate wavelength, such as in the infrared, the visual or the ultraviolet wavelength range. In many applications the wavelength of the light emitting device may not be important, however in measurements where the emitting light may interact with the substance to be detected and possible cause light-induced reactions, to obtain a better reflectivity or for other reasons, the wavelength may be chosen accordingly.

The optical sensing means may more specifically contains a light source that directs a beam of light onto the membrane and a position sensitive detector that receives light reflected by the cantilever. Deformation of the membrane is deduced by a detected position of the light beam on the position sensitive detector. Further, the Components of the sensing means being well-known components, such as a laser, and a position sensitive detector, such as a segmented photodiode or a CCD-type detector. It is an advantage to be able to use well-known components in conjunction with the present invention, because many laboratories already possess such components and the cantilever array of the present invention may thus easily be combined with existing equipment in many laboratories. Alternatively, the optical sensing means may be provided in a pre-fabricated assembly adapted to fit to an embodiment of the present invention.

Figure 3:
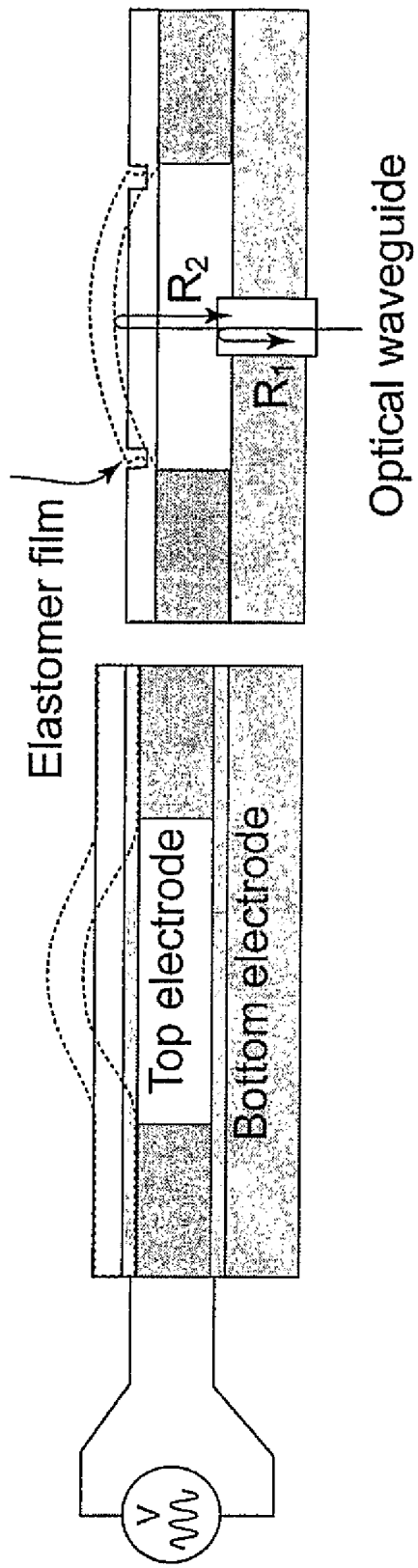
FIG. 3 are drawings showing a bioelectrical (3A) and an optical (3B) detection for the membrane deformation.

Bioelectronic sensing methods can also be used for the immediate detection of deformation if the membrane of the sensor as shown in FIG. 3. Transduction elements that translate mechanical deformation into electronic signals can be directly integrated into a micro-chip contained on the platform 108 of the sensor 100. Alternatively, the membrane deformation induces changes in resistance in micro-patterned conductive lines disposed adjacent to the membrane (FIG. 3A). Further, deformation induces changes in capacitance across a micro-fabricated gap with an electrode adhered to the polymer structure which can be measured using interferometry (FIG. 3B).

A novel aspect in the proposed device of some of the various embodiments is to construct structures that are "built-in" or clamped along the outer edges. Although this limits deformation in comparison to cantilevers, it introduces robustness and facilitates integration into µ-TAS. The sensor can be created directly from existing microfluidic valves by directly functionalizing the valve surface. The use of polymeric materials enables much thicker films to be utilized without compromising sensitivity. The increased compliance of the membrane also makes the clamped structure prone to buckling, wherein the membrane 'pops' out of plane when adsorption takes place. This phenomenon exaggerates the difference between pre-adsorption and post-adsorption deformation, and thus facilitates signal processing. This enhance difference can be conducive to visual detection, including color change or opaqueness, not requiring expensive or ultra-sensitive, special equipment or hardware.

This "buckling" effect is unique to the sensor of the present invention and is not possible with the cantilever sensors of the prior art. "Buckling" refers to an effect where the membrane deforms only when a critical amount of analyte adsorption (e.g., mass of adsorbed analyte) takes place. This produces a qualitative 'yes/no' signal that is non-linearly related to the amount of analyte present. In this embodiment, instead of bending gradually as the analyte is adsorbed on its surface (linear relationship between analyte adsorbed and amount of bending), as in the cantilever sensor, the membrane buckles (and deforms) only when the analyte reaches a critical adsorbed mass (linear relationship between analyte adsorbed and membrane deformation). Prior to this critical number, the membrane does not deform as the surface stress is not sufficient to buckle the membrane One strategy for microfabricated sensors is to construct slender "v"-shaped beams, such as that shown in FIG. 11. The central concept is to translate stresses generated along the axes of the freestanding beams into in-plane displacements along the symmetry plane. The asymmetry of the structure, and the clamped boundary conditions implies that single-sided adsorption is not necessary. This not only facilitates surface functionalization but also increases sensitivity because the entire surface of the structure is utilized. The structural asymmetry increases sensitivity over straight devices that exploit buckling, and induces a directional bias that facilitates transduction. The in-plane deformation can be easily monitored using vernier scales or capacitance gauges that are tuned to the displacement range of interest.

Figure 11:
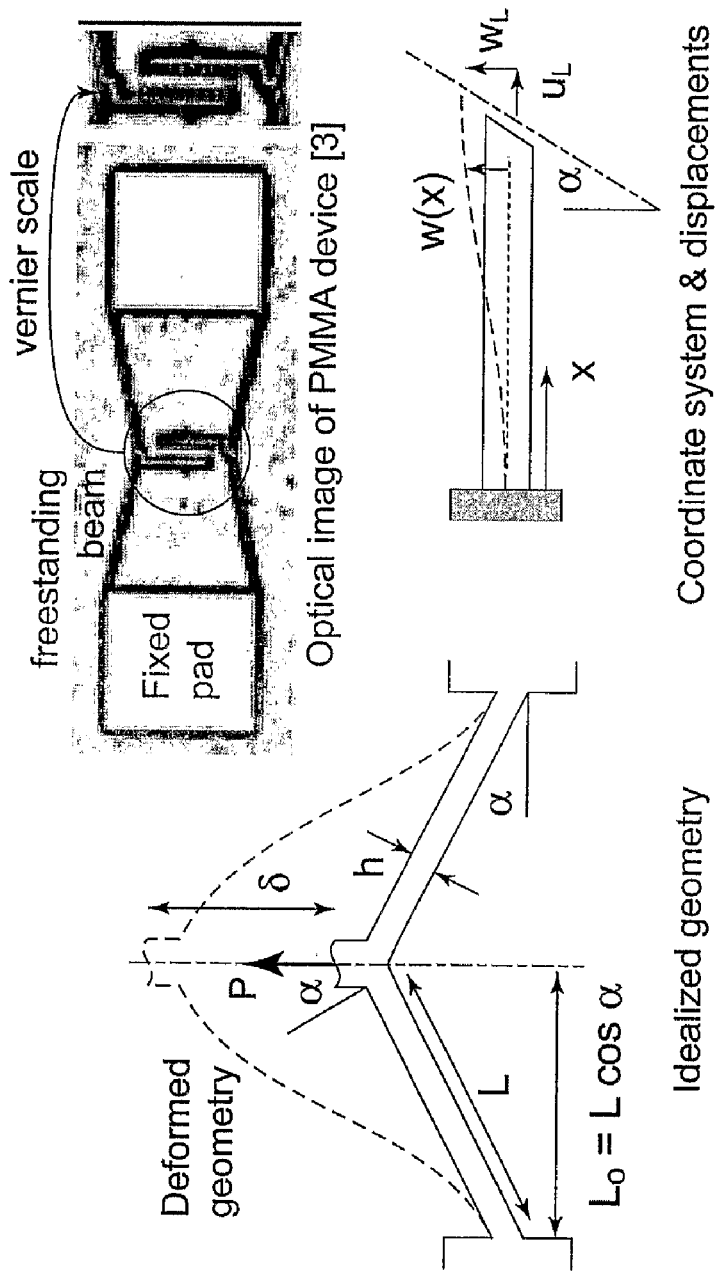
FIG. 11 are drawings and photograph showing the kinked membrane.

The idealized model for the kinked (bent) beam sensor is shown schematically in FIG. 11. One half of the symmetric structure is analyzed. For compressive surface stresses ($\lambda^2<0$), the displacement along the symmetry axis is given by:

$$\hat{\delta} = -\frac{\sec^2\alpha\tan\alpha}{\lambda}\left(\lambda - 2\tan\left(\frac{\lambda}{2}\right)\right), \quad (\text{eqn. 1})$$

where $$\hat{\delta} = \delta/L,$$

$\alpha$ is the kink angle and $\lambda$ is the solution to the non-linear equation:

$$\varepsilon_o - \frac{\bar{h}^2\lambda^2}{12} + \frac{\sec^2\alpha\cos^2\left(\frac{\lambda}{2}\right)}{2\lambda}(\sin\alpha)^2(2\lambda + \lambda\cos h\lambda - 3\sinh\lambda) + \frac{\tan\alpha\sec\alpha}{\lambda}(\sin\alpha)\left(\lambda - 2\tan\left(\frac{\lambda}{2}\right)\right) = 0, \quad (\text{eqn. 2})$$

where $$\varepsilon_o \equiv \Delta\alpha\Delta T - \frac{\sigma_o}{E} - \frac{2\gamma(b+h)}{Ebh} \quad (\text{eqn. 3})$$

and E is the elastic modulus, $\Delta\alpha\equiv\alpha-\alpha_s$ is the differential coefficient of thermal expansion relative to the substrate, $\Delta T=T-T_o$ is the temperature change from the reference temperature (at which thermal strains are zero), $\sigma_o$ is the intrinsic stress arising from fabrication, $\gamma$ is a surface stress (as might be generated by molecular adsorption), h is the beam width (or height in the bending direction) and b is the thickness of the beam in the z-direction.

Elementary beam theory, which neglects axial/transverse coupling entirely, can be used to derive results for small deflections, i.e. linear solutions appropriate for small surface stresses. The output displacement in this limit is given by:

$$\hat{\delta} = \frac{(\varepsilon_o\sin\alpha)}{\bar{h}^2\cos^2\alpha + \sin^2\alpha} \quad (\text{eqn. 4})$$

Note that as the kink angle goes to zero, the deflection goes to zero. This is reflection of the fact that a critical buckling stress must be reached. For a perfectly straight structure and single sided adsorption, the critical surface stress to cause deformation is given by:

$$\gamma_{crit}=\pi Eh^3/L^2 \quad (\text{eqn. 5})$$

The displacement of the straight structure will be zero until this critical surface stress is reached. This result makes it clear that materials with lower elastic modulus will lower the critical surface stress needed for motion. For surface stresses above the critical limit, the displacement of the sensor (with single sided adsorption) is given by:

$$\hat{\delta} = \frac{\sqrt{8}}{\pi}\sqrt{\frac{\gamma - \gamma_{crit}}{Eh}} \quad \text{(eqn. 6)}$$

This makes it clear that lowering the modulus increases the displacement.

Figure 12:
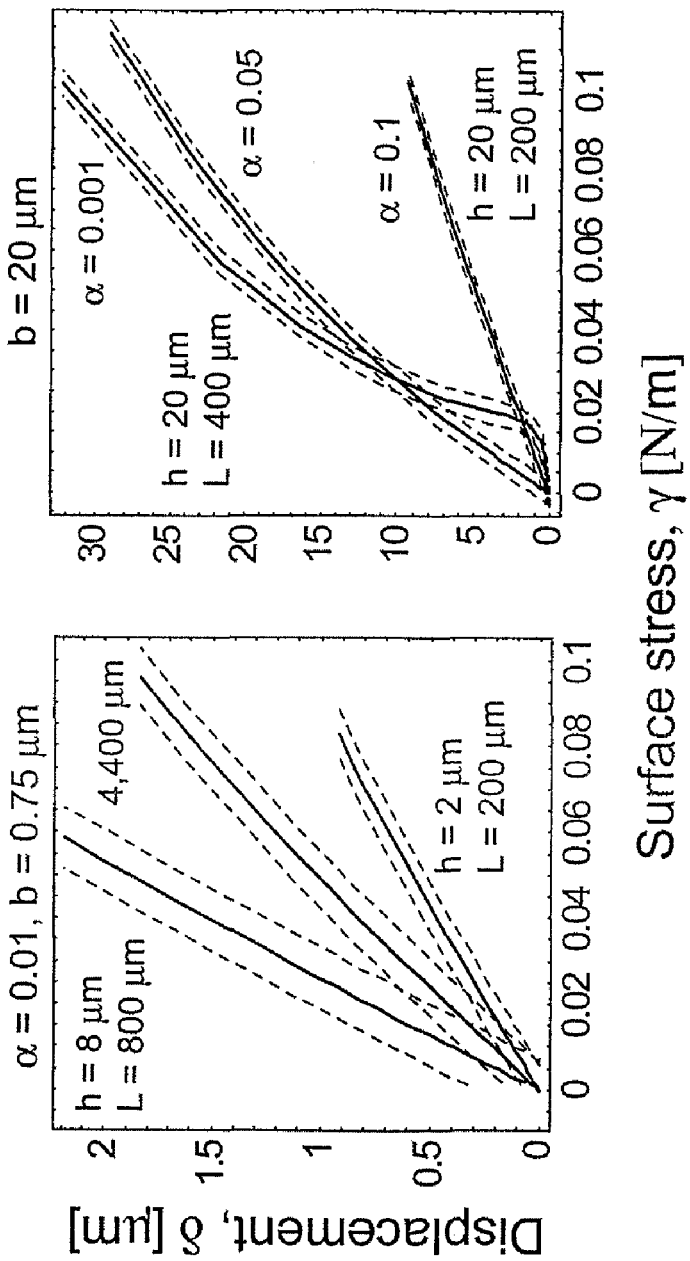
FIG. 12 are graphs showing membrane displacement v. stress of glassy polymers (12A) and rubbery polymers (12B)

For a kinked structure, there is not a specific critical stress, rather, the output displacement is a highly non-linear function of surface stress, as described by the equations above. The effect of changing the kink angle is shown in FIG. 12.

The two fundamental design variables are the kink angle $\alpha$ and the aspect ratio of the beams, $\bar{h} = h/L$. The central challenge is to identify appropriate values to achieve the desired relationship between output displacement, $$\hat{\delta} = \delta/L,$$

and the generalized input strain, $\epsilon_o$ (to simplify the present discussion, the external load P is taken to be zero). In many contexts, the ideal input/output relationship would be linear $$(\text{i.e. } \hat{\delta} = m\varepsilon_o),$$

with a high sensitivity (i.e. large m). However, as will be demonstrated, these goals—linearity and sensitivity—are often in conflict with one another. The key to understanding this is to recognize that the input strain $\epsilon_o$ is quite small in most applications, i.e. $\epsilon_o$ typically ranges from $10^{-6}$ to $10^{-2}$. As such, non-linear regimes where $$\hat{\delta} \propto \sqrt{\varepsilon_o}$$

can lead to larger displacements than regimes where $$\hat{\delta} \propto \sqrt{\varepsilon_o}.$$

A fundamental characteristic of the kinked beam sensor is that the greatest sensitivity is achieved when $\alpha$ and $\bar{h}$ are both small and comparable.

FIG. 12 illustrates the displacements resulting from adsorption, for several devices made out of two different polymers. On the left are the results for devices comprised of glassy polymer, with properties typical of photoresist or poly (methylmethacrylate) (PMMA). The results on the right are for devices comprised of a rubbery polymer, such as poly (dimethylsiloxane) (PDMS). The key distinction between these devices is their dramatically different elastic modulus, which implies the input strain $\epsilon_o$ for a given surface stress $\gamma$ will differ by orders of magnitude.

The left side of FIG. 12 illustrates that glassy polymers structures with dimensions typical of existing devices will exhibit displacements that are an order of magnitude larger than silicon cantilevers of comparable dimensions. If existing polymeric kinked beam sensors are elongated—a highly feasible strategy considering the dry-etching used to release such structures—one can achieve displacements>~2 μm. Of course, such sensors will be susceptible to temperature-induced deformation (the dashed lines in FIG. 12 represent the shifts that occur for a prescribed temperature shift). The glassy polymer is notably sensitive to temperature changes: 0.1° C. changes may lead to ~250 nm of displacement. This implies that strict temperature control is required to eliminate the obfuscating effects of thermal expansion.

Conversely, the glassy polymer structure will be quite sensitive as a temperature sensor: temperature changes on the order of 1° C. translate into μm-scale displacements. One can reinterpret the abscissa as temperature by converting surface stress to equivalent temperature change using eqn. 3 above.

The right side of FIG. 12 illustrates that elastomers (such as PDMS) create the opportunity to construct incredibly sensitive adsorption sensors. Here, the dramatic decrease in modulus results in displacements on the order of tens of microns—even for much wider, thicker and shorter devices. Moreover, the device with extremely small kink angle holds the potential to distinguish between specific and non-specific adsorption. Non-specific adsorption (which usually involves physisorption as opposed to covalent bonding) leads to smaller surface stresses. With proper design, the buckle-type device can be constructed to exhibit very small displacements as a result of low surface stresses, yet large displacements for larger surface stresses generated by covalent bonding of specific species. Alternatively, if non-specific binding is not relevant, a small but finite kink angle results in a device that is highly sensitive to surface stress: such devices create the opportunity to measure surface stresses with unprecedented resolution.

Perhaps surprisingly, the PDMS device is less sensitive to temperature, despite its much larger CTE (300 ppm/° C. as compared to 70 ppm/° C. for the glassy polymer). The dashed lines represent 1° C. temperature shifts, which are an order of magnitude larger than those for the glassy polymer. The apparent temperature insensitivity of the PDMS device arises from the fact that the surface stress term in eqn. (3) dominates the thermal expansion term. Temperature induced displacements are not small per se (indeed, they are on the order of microns), but rather are much smaller than those induced by adsorption.

Figure 4:
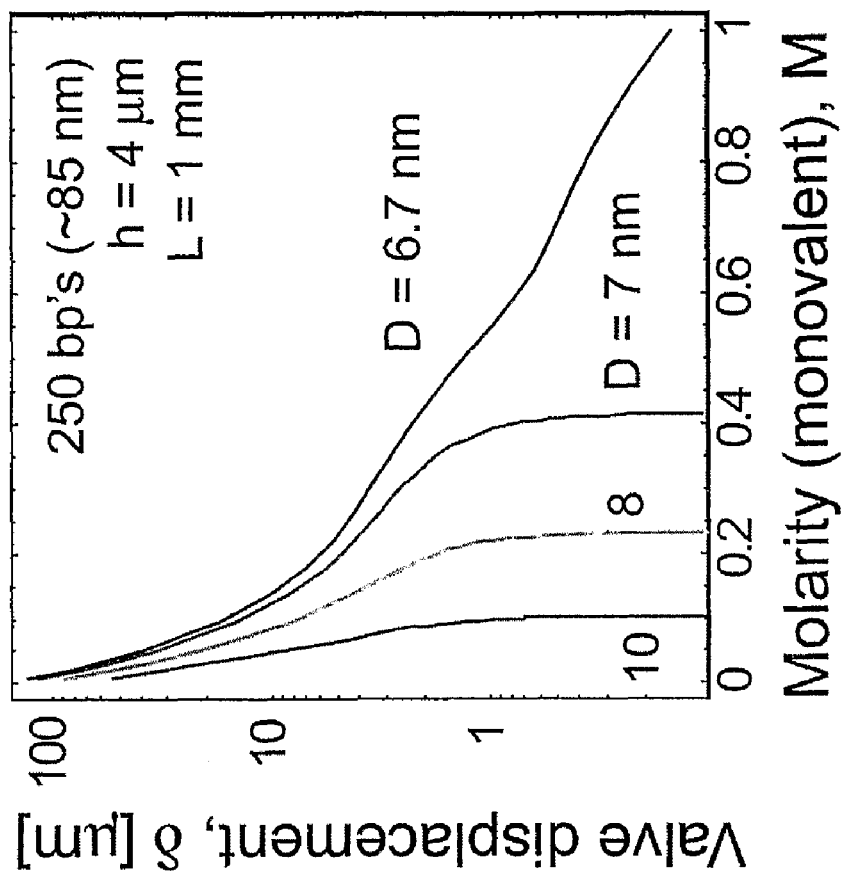
FIG. 4 is a graph showing membrane displacement v. molarity of analyte.

FIG. 4 shows the theoretical performance of elastomer membrane with adsorbed polyelectrolytes, such as DNA. The membrane can be in-plane or out-of-plane (buckled) by controlling the concentration (molarity) of the analyte. Above a critical concentration, the surface stresses generated via DNA interaction are insufficient to trigger buckling. As the chemical environment surrounding the adsorbed polyelectrolyte brush becomes more pure, electrostatic screening is decreased, which in turn increases molecular repulsion and triggers buckling of the film.

Figure 5:
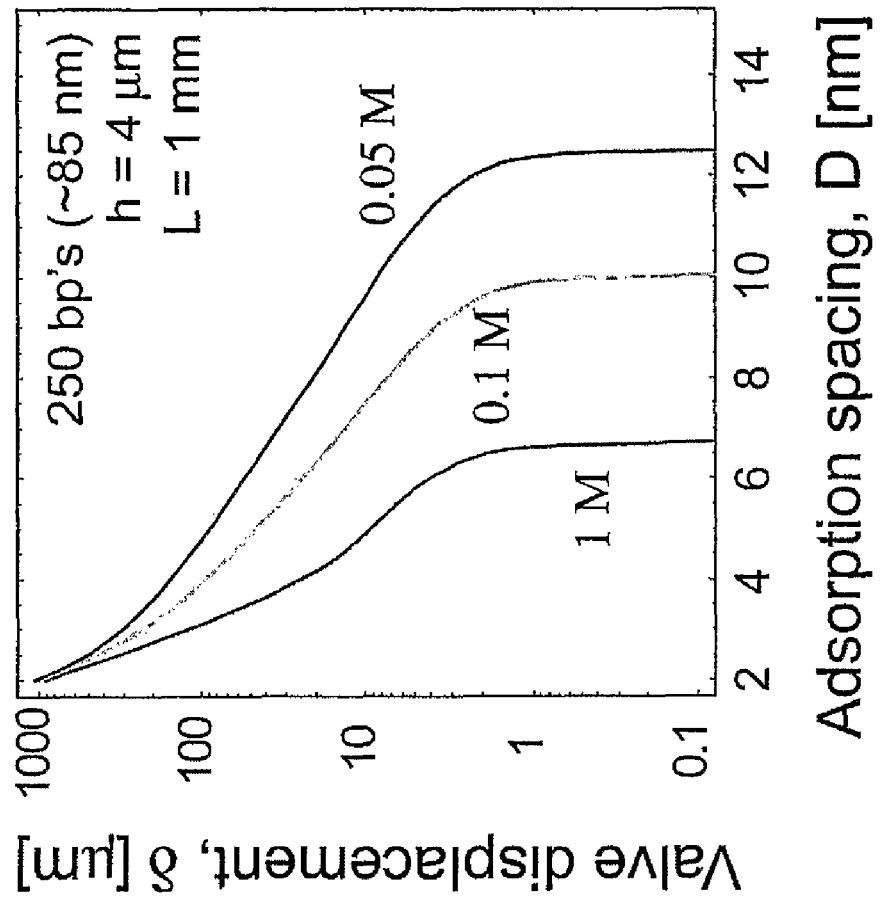
FIG. 5 is a graph showing membrane displacement v. adsorption spacing.

FIG. 5 shows membrane displacements vs. adsorption spacing for a polyelectrolyte, such as DNA, for several different concentrations (molarity). The shaded region illustrates grafting densities that have been achieved experimentally. These predictions illustrate that it is feasible to construct fluidic control elements that guide fluid flow in micro-chips.

Figure 6:
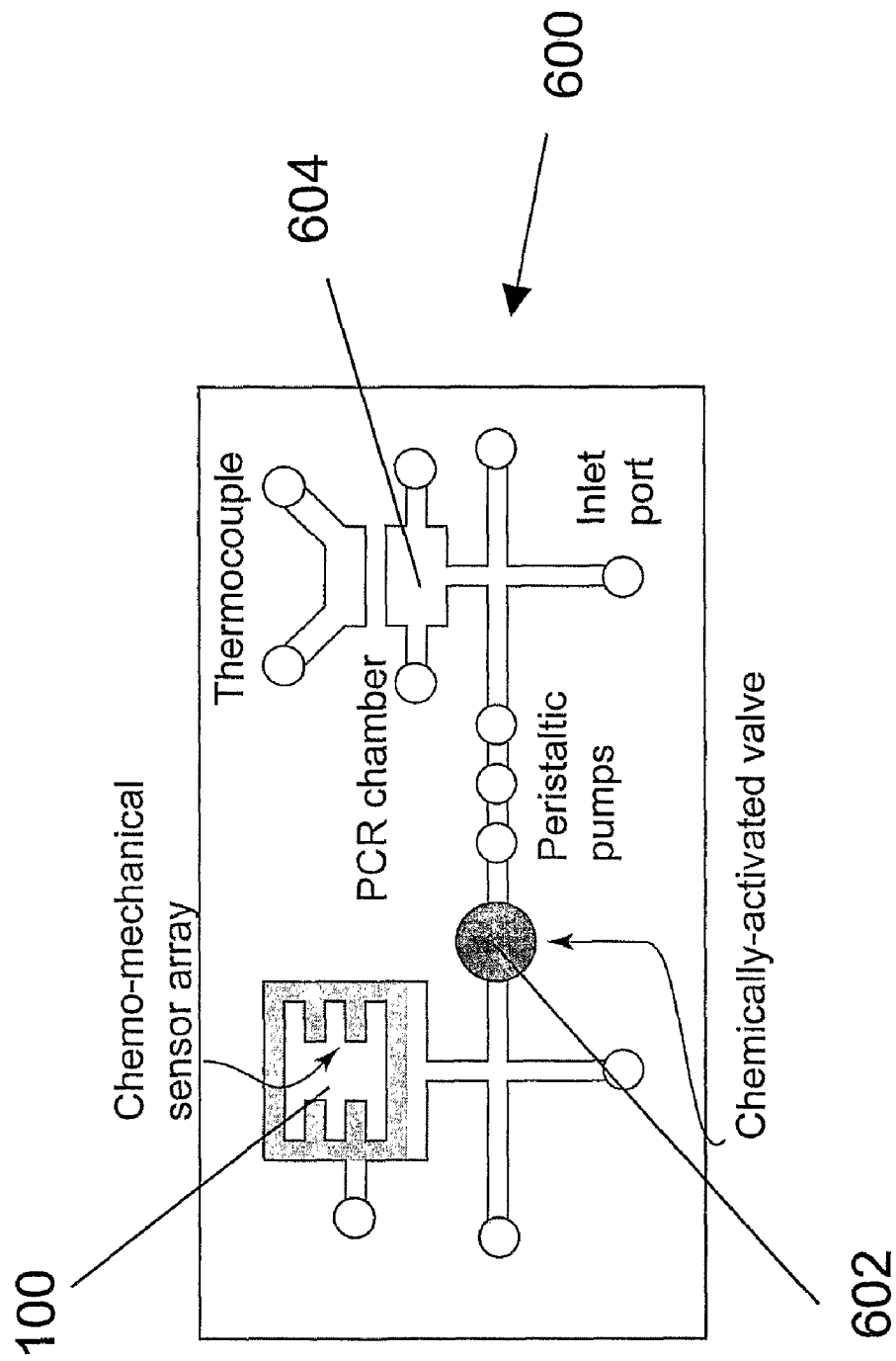
FIG. 6 is a drawing showing the sensor and valve incorporated into a micro-total analysis system (μ-TAS).

In a preferred embodiment, the sensor of the present invention in integrated with a μ-TAS. There are many formats, materials, and size scales for constructing μ-TAS. Common μ-TAS devices are disclosed in U.S. Pat. Nos. 6,692,700 to Handique et al.; 6,919,046 to O'Connor et al.; 6,551,841 to Wilding et al.; 6,630,353 to Parce et al.; 6,620,625 to Wolk et al.; and 6,517,234 to Kopf-Sill et al.; the disclosures of which are incorporated herein by reference. Typically, a μ-TAS device is made up of two or more substrates that are bonded together. Microscale components for processing fluids are disposed on a surface of one or more of the substrates. These microscale components include, but are not limited to, reaction chambers, electrophoresis modules, microchannels, fluid reservoirs, detectors, valves, or mixers. When the substrates are bonded together, the microscale components are enclosed and sandwiched between the substrates. FIG. 6 illustrates the sensor of the present invention integrated with a μ-TAS 600. Typically, the sensor 100 is place down stream of a reaction chamber 604 or separation domain to detect analytes coming therefrom.

Figure 7:
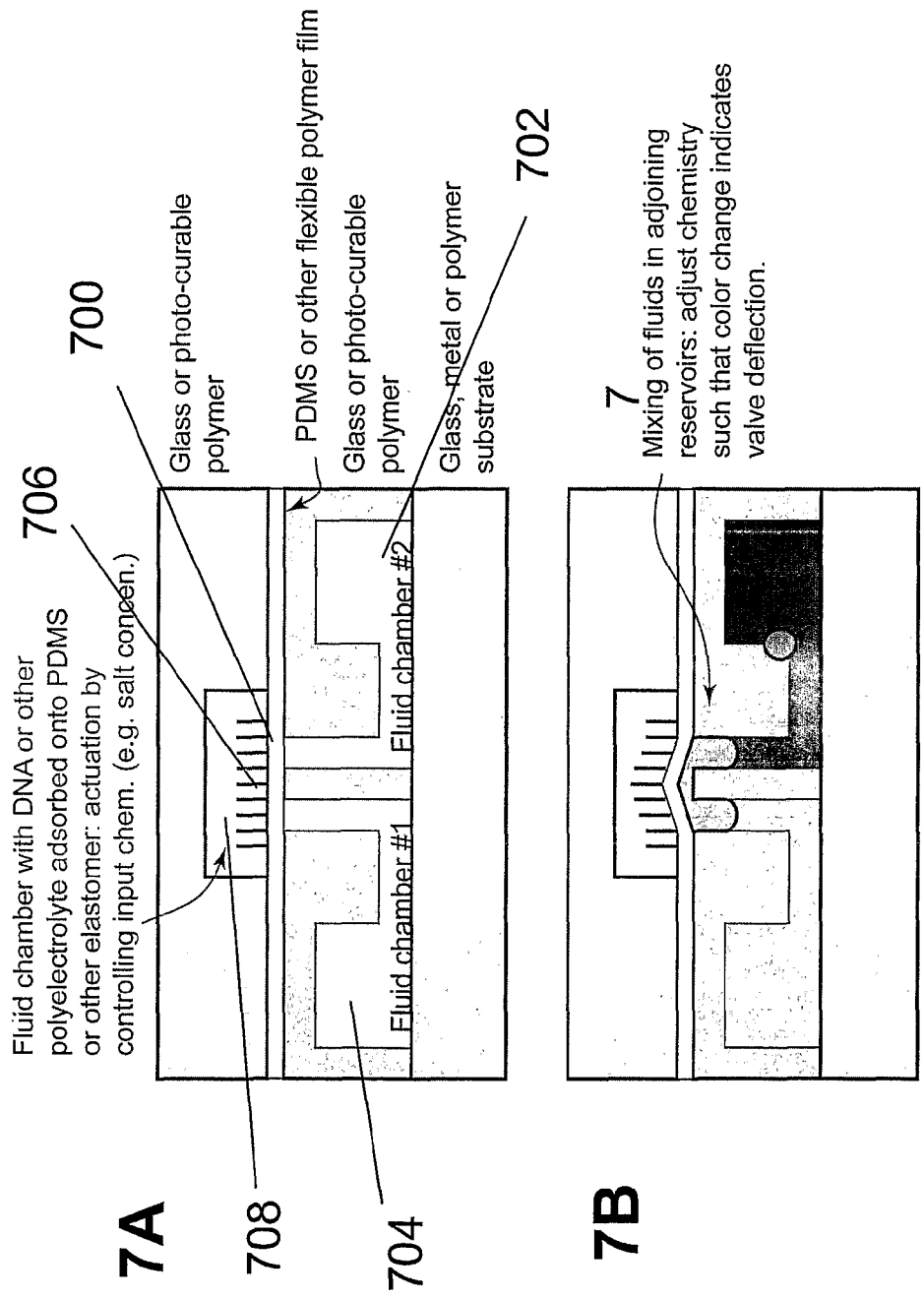
FIG. 7 are drawings showing a valve embodiment in a closed position (7A) and open position (7B).

In another embodiment of the present invention, the membrane deformation can also be used as a chemically-actuated valve to control fluid flow in a μ-TAS (see 602 in FIG. 6). The valve may be designed as illustrated in FIG. 7. In 7A, the valve 700 blocks mixing of fluid between the two fluid chambers 702 and 704. The top surface 706 of the valve 700 is derivatized with a binding member such by adding sufficient amount of an analyte (that binds the binding member) to the top chamber 708 the valve deforms, thus opening the valve and allowing the fluid in the two fluid chambers 702 and 704 to mix. Other valve designs are apparent to those skilled in the art without undue experimentation.

Figure 8:
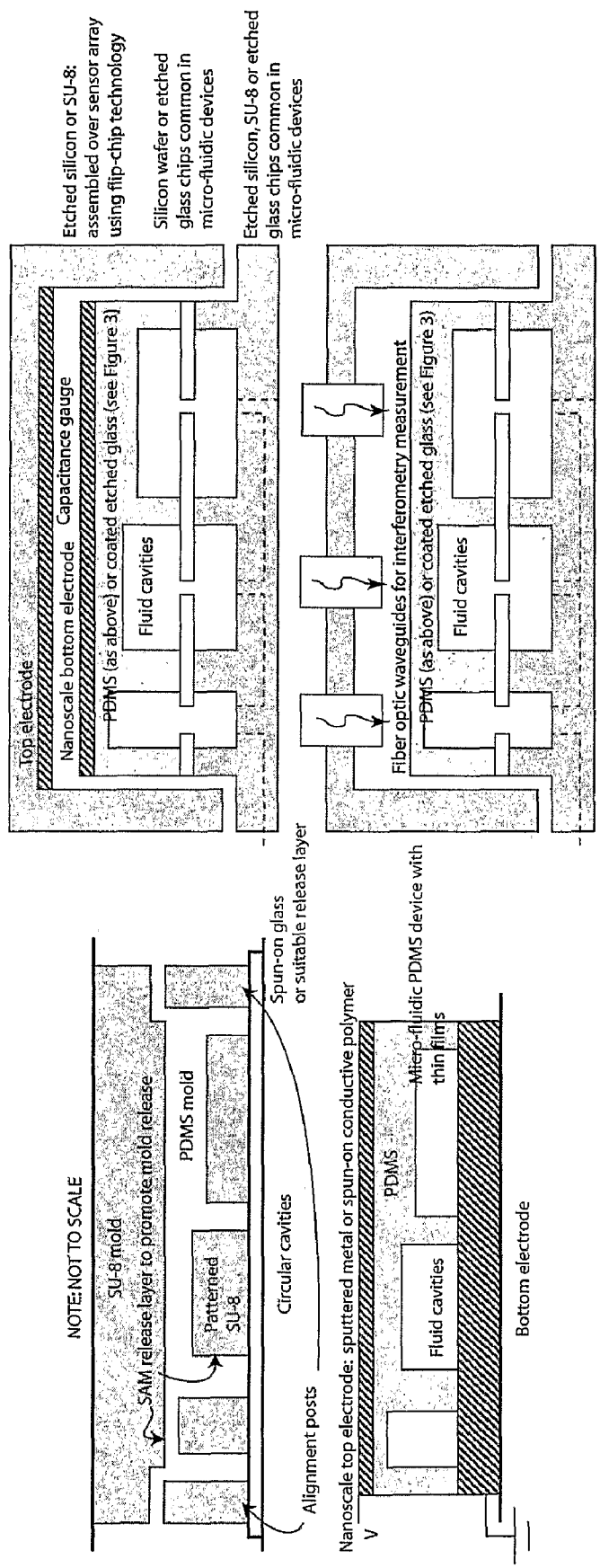
FIG. 8 are drawings showing the mechanical flip-chip assembly.
Figure 9:
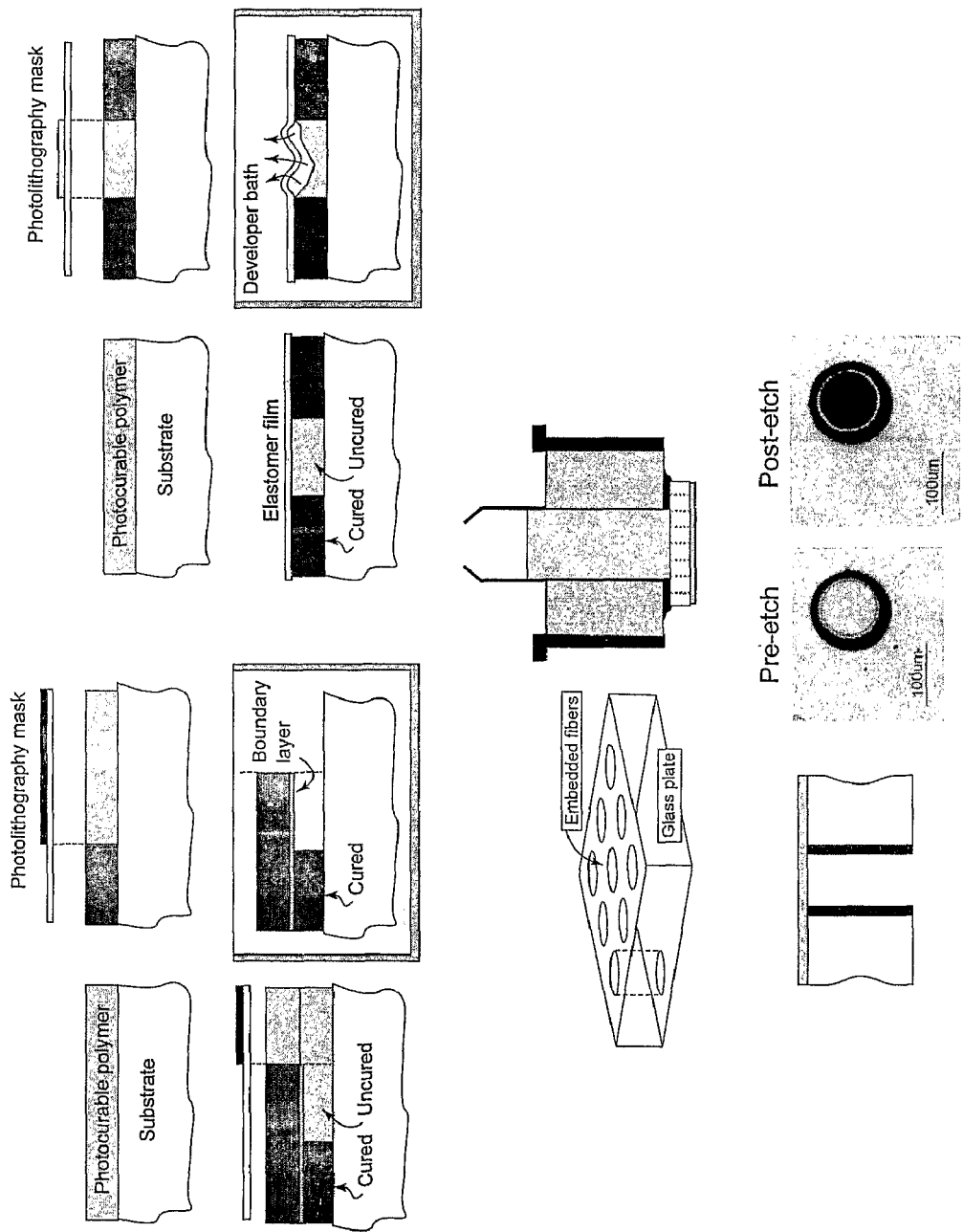
FIG. 9 are drawings showing sacrificial etching using photo-curable polymers.

The present invention can be assembled following two distinct approaches, shown in FIGS. 8 and 9: (i) mechanical flip-chip assembly, and (ii) sacrificial etching using photo-curable polymers.

i) Mechanical flip-chip assembly: freestanding polymeric structures can be fabricated by creating a mold out of photo-curable polymers and etched silicon. This is illustrated on the left of FIG. 8. The lower portion of the mold consists of photo-patterned SU-8 on top of any standard wafer. These elements will form the cavities of the device after the mold is removed. SU-8 guideposts on the corner of the wafer are slightly higher than the interior steps, such that when the top SU-8 mold piece is laid on top of the bottom, a microscale gap is formed. This microscale gap governs the thickness of the freestanding polymer film. PDMS or expoxy resin can be mixed and used to fill the mold: the entire assembly is then vacuumed to remove entrained air. After curing, the upper and lower mold sections are removed to create the structure on the bottom left of FIG. 8. Release of the polymer base structure can be facilitated by coating the mold surfaces with silane mono-layers which reduce adhesion.

Transduction can be achieved by sputtering metal electrodes on the layer beneath the polymer structure and on top of the polymer structure, as shown in FIG. 8. The bottom electrode is simply sputtered on the support wafer prior to mechanically assembling the polymeric structure, while the top layer is sputtered on top of the polymer structure after assembly. Alternatively, multiple layers could be used with mechanical assembly, as shown on the right of FIG. 8. The bottom layer can be comprised of micro-fluidic chambers using multiple glass chips, as is common in microfluidic devices. An electrostatic gap can be created on top of the films by creating a cavity in top wafer and sputtering an electrode at the bottom of the cavity. This gap can be created either by photo-patterning SU-8 or etching a silicon or glass wafer. The motion of the film is then measured by monitoring the capacitance across the gap on top of the structure.

The mechanical assembly method can also be used to introduce optical waveguides (or fibers): in this case, the fibers are embedded in the top wafer and Fabry-Perot inteferometry is used to measure the gap size from the top layer to the polymer structure. This approach has the advantage of allowing much larger gap sizes, as interferometry can be used across relatively large distances.

ii) Sacrificial etching of patterned substrates: FIG. 9 illustrates three different techniques that can be used to create freestanding polymeric structures. On the top left, a base structure is created by patterning a photocurable polymer: prior to development however, a second layer of photoresist is spun-coated. Because the depth of cure is carefully controlled, subsequent exposure of the top layer (which comprises the freestanding structure) does not cure the underlayer. Exposure to photoresist developer then removes the uncured photoresist from beneath the structure.

A similar procedure can be used to construct freestanding elastomer films, as shown in the top right of FIG. 9. In this procedure, the base structure is once again a photo-patterned polymer. Prior to developing, the elastomer layer is deposited using either spin-coating or draw-down techniques. (The latter has the advantage of avoiding residual stresses introduced during spin-coating.) Exposure to the photoresist developer removes the uncured photoresist beneath the polymer: this can be facilitated by patterning access channels in the photoresist to provide a pathway for developer. Alternatively, the molecular network of the elastomer can be engineered to swell in response to the developer: as shown in FIG. 9, the uncured photoresist can be removed by dissolving it through the capping elastomer layer.

Finally, freestanding polymeric structures can be fabricated by using glass substrates with embedded features that can be removed via backside etching. This is shown on the bottom of FIG. 9. The procedure starts by spin-coating a polymeric film on a glass chip with embedded etchable fibers. An etching chamber adhered to the back of the chip is used to remove the fibers. The result is a perfectly flat, perfectly circular, freestanding film of polymer. This structure can then be metallized and combined with the assembly techniques illustrated in FIG. 8.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A device, comprising:
   a polymeric membrane or beam having thereon a binding member specific for an analyte; and
   a platform for supporting the membrane or beam;
   wherein the membrane or beam is clamped at least at two opposing ends, and
   wherein the membrane or beam is configured to deform in response to binding of the analyte to the binding member.

2. The device of claim 1, wherein the membrane or beam contains a kink therein.

3. The device of claim 1, wherein the membrane or beam is made of polydimethylsiloxane (PDMS) or polymethylmethacrylate (PMMA).

4. The device of claim 1, wherein the binding member is selected from the group consisting of peptide, protein, polysaccharide, nucleic acid, carbohydrate, antigen, and pharmacological agent.

5. The device of claim 4, wherein the protein is enzyme or antibody.

6. The device of claim 4, wherein the nucleic acid is DNA, RNA, or oligonucleotides.

7. The device of claim 1, wherein the membrane or beam is clamped around its periphery.

8. The device of claim 1, further comprising a detection mechanism for measuring membrane or beam deformation.

9. The device of claim 8, wherein the detection mechanism is an electronic circuit.

10. The device of claim 8, wherein the detection mechanism is an interferometer.

11. The device of claim 8, wherein the detection mechanism is optical detection.

12. The device of claim 8, wherein the detection is based on visual observation of a physical change.

13. The device of claim 1, wherein the deformation is buckling of the membrane or beam.

14. A valve that is actuatable by a chemical, the valve comprising:
a polymeric membrane or beam having thereon a binding member specific for the chemical; and
a platform for supporting the membrane or beam;
wherein the membrane or beam is clamped at least at two opposing ends, and
wherein the membrane or beam is configured to deform in response to binding of the chemical to the binding member.

15. The valve of claim 14, wherein the membrane or beam contains a kink therein.

16. The valve of claim 14, wherein the membrane or beam is made of polydimethylsiloxane (PDMS) or polymethylmethacrylate (PMMA).

17. The valve of claim 14, wherein the binding member is selected from the group consisting of peptide, protein, polysaccharide, nucleic acid, carbohydrate, antigen, and pharmacological agent.

18. The valve of claim 17, wherein the protein is enzyme or antibody.

19. The valve of claim 17, wherein the nucleic acid is DNA, RNA, or oligonucleotides.

20. The valve of claim 14, wherein the membrane or beam is clamped around its periphery.

21. The valve of claim 14, further comprising a detection mechanism for measuring membrane or beam deformation.

22. The valve of claim 21, wherein the detection mechanism is an electronic circuit.

23. The valve of claim 21, wherein the detection mechanism is an interferometer.

24. The valve of claim 21, wherein the detection mechanism is optical detection.

25. The valve of claim 21, wherein the detection is based on visual observation of a physical change.

26. The valve of claim 21, wherein the deformation is buckling of the membrane or beam.

* * * * *